Oct. 9, 1934.    J. J. COMPO    1,975,925
COUPLING
Filed Oct. 27, 1933
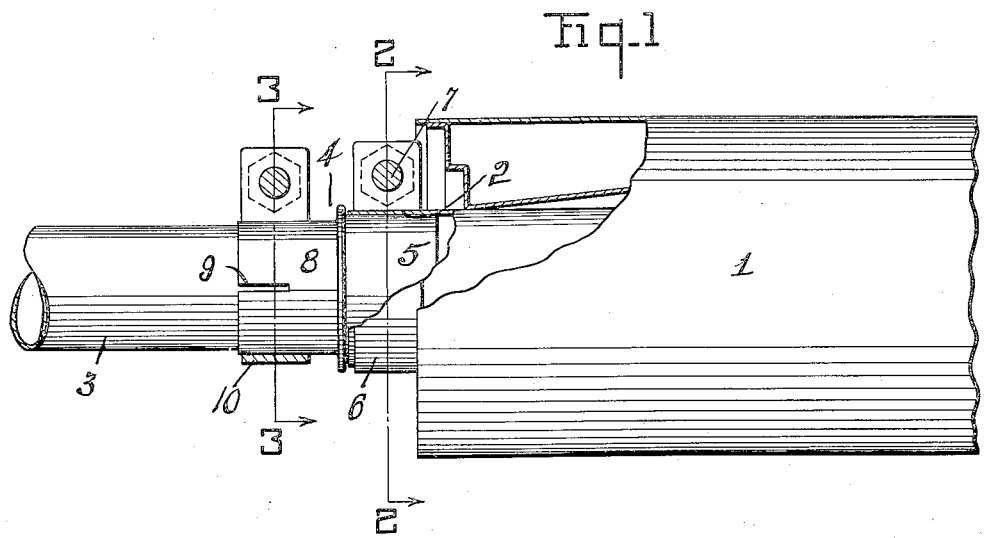
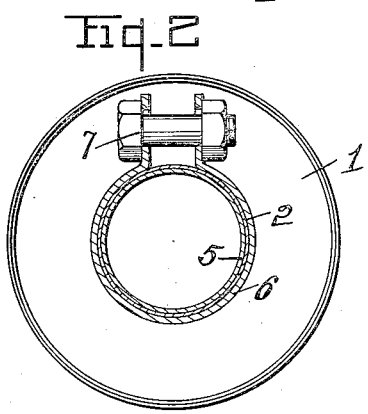
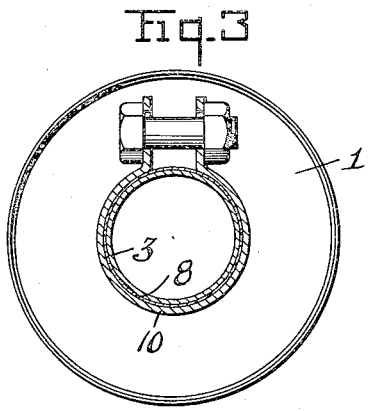
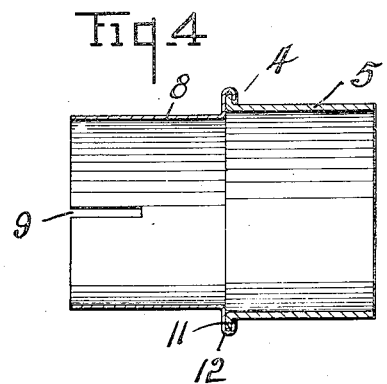
Inventor
John J. Compo.

Patented Oct. 9, 1934

1,975,925

UNITED STATES PATENT OFFICE 1,975,925

COUPLING

John J. Compo, Defiance, Ohio

Application October 27, 1933, Serial No. 695,445

1 Claim. (Cl. 285—201)

This invention relates to devices for coupling exhaust mufflers to the exhaust pipes of internal combustion engines, and particularly to those of the reducing type.

In the use of such devices, it is found that exhaust pipes differ quite generally in cross-sectional size not only with different makes of automobiles, but frequently with the same makes for different models, and also that the flanges or nipples on the inlet ends of mufflers are, as a rule, quite uniform in size, thus necessitating the use of couplings for the pipes and mufflers, which couplings must be provided with one sized end for fitting the muffler flanges and with the same or different sized end for fitting the exhaust pipe.

It is also found that exhaust pipes are frequently out-of-round or distorted in cross-sectional shape, so that it is extremely difficult, and in many cases practically impossible, to provide a clamping connection therewith that will not leak exhaust gases, while, on the other hand, the muffler flanges are usually true and little difficulty, as a rule, is encountered in making a tight joint therewith. Due to the position of mufflers under automobiles, any leakage of gas from its connections is apt to enter the automobile body through the floor and be not only very objectionable but dangerous to the lives of the occupants.

The object of the present invention is the provision of a muffler of the class described, capable of being made in various sizes as to either end, and adapted to not only fit the muffler flange or nipple, but to have its exhaust pipe-connecting end capable of distortion to conform to and closely fit any distortion of the exhaust pipe when clamped thereto.

The invention is fully described in the following specification, and while in its broader aspect it is capable of embodiment in numerous forms, one embodiment is illustrated in the accompanying drawing, in which—

Figure 1 is a fragmentary elevation of a muffler and exhaust-pipe connected together by a coupling embodying the invention, with parts broken away; Figs. 2 and 3 are sections, respectively, on the lines 2—2 and 3—3 in Fig. 1, and Fig. 4 is an enlarged central longitudinal section of the coupling member alone.

Referring to the drawing, 1 designates a muffler of any type or design having a tubular nipple or flange 2 at an end thereof for connection with an exhaust pipe 3 through the medium of a coupler 4, in which latter the present invention resides. The coupler 4 has a cylindrical end 5 conforming to the sizes of the muffler nipple 2 and adapted to be fitted therein and securely attached thereto customarily by a split-form of ring-clamp 6, having its ends turned outward in adjacent spaced relation and perforated to receive a clamping bolt 7, as well understood in the art. The coupler also has a cylindrical end 8 of a size suitable to closely receive the adjacent end of the exhaust pipe 3 and provided with one or more angularly spaced slots 9 extending inward a distance from its free end to facilitate expansion or contraction to fit the exhaust pipe. A clamp 10, similar to clamp 6, embraces the coupling end 8 and causes it to securely engage the exhaust pipe.

It is found in practice that for efficient and satisfactory results, the muffler engaging end 5 of the coupler should be sufficiently strong to prevent liability of distortion when the muffler nipple is clamped thereto, and that the pipe-nipple engaging end 8 should be weak relative to the end 5 to an extent that will permit the end 8 to flex and closely conform to the out of true or distended end of the pipe 3 to which it is clamped. For this purpose, the coupler is made in two sections formed from sheet metal of different gauge, as best illustrated in Fig. 4, with the inner ends thereof rigidly connected in a suitable manner. In the present instance, the heavy end section 5 has its inner end provided with an annular out-turned radial flange 11, and the inner end of the relative weak end section 8 is provided with an annular out-turned radial flange 12, the free edge of which is doubled over the free edge of the flange 10 to rigidly unite the two. This manner of connection of the ends of the coupler sections also provides the coupler with an annular outwardly extending flange or shoulder at the inner end of the section 5 to coact with the outer end of the muffler nipple 2 to serve as a stop for limiting the extent of insertion of the coupler into such nipple.

It is apparent that with this construction of coupler, that the end thereof, which is adapted to enter and be clamped by external means to the muffler nipple, is of rigid construction to facilitate such clamping while the other end of the coupler is relatively weak to a sufficient extent to render such end more or less flexible to permit its conformance to the possibly distorted cross-sectional shape of the exhaust pipe when clamped thereto. This prevents or reduces to a minimum the liability of leakage occurring between the exhaust pipe and encircling portion of the coupler, and at the same time facilitates and materially lessens the labor incident to the use of couplers in connecting exhaust pipes to mufflers over the means now commonly employed, thus enhancing the practicability and commercial value of such couplers.

I wish it understood that my invention is not limited to any specific construction, arrangement or form of the parts, as it is capable of numerous modifications and changes without departing from the spirit of the claim.

Having thus described my invention, what I claim as new, and desire to secure by United States Letters Patent, is:

A coupling for connecting exhaust mufflers to the exhaust pipes of internal combustion engines, comprising a rear tubular cylindrical member for insertion in the receiving nipple of a muffler and a front tubular cylindrical member for receiving therein the exhaust pipe of a muffler, said rear member being formed at its outer end with a solid and continuous outwardly extending circular flange of the same thickness as the material of the rear member, the front member having its rear end extended at right angles and abutting the front face of the flange and engaged over the periphery of the flange and abutting the rear face of the flange, and forming a stop to engage the free outer end of the receiving nipple thereby to restrict the extent of insertion of the coupling into said nipple, a removable clamp disposed about the entire periphery of the rear member and rearwardly of the stop, the front member having longitudinal spaced slots and being formed of material of lighter gage than that of the rear member whereby to render same flexible, and a removable clamp engaged about the entire periphery of the front member and over the slots thereof.

JOHN J. COMPO.